United States Patent
Yamada et al.

(10) Patent No.: US 8,566,017 B2
(45) Date of Patent: Oct. 22, 2013

(54) DRIVING SUPPORT APPARATUS FOR VEHICLE

(75) Inventors: Koichi Yamada, Tokyo (JP); Atsuyoshi Takazawa, Tokyo (JP); Hiroyuki Kawabe, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 215 days.

(21) Appl. No.: 13/137,923

(22) Filed: Sep. 21, 2011

(65) Prior Publication Data

US 2012/0078500 A1    Mar. 29, 2012

(30) Foreign Application Priority Data

Sep. 29, 2010    (JP) .................................. 2010-219650

(51) Int. Cl.
*G08G 1/16*    (2006.01)

(52) U.S. Cl.
USPC ............................. 701/301; 701/36; 340/438

(58) Field of Classification Search
None
See application file for complete search history.

(56) References Cited

U.S. PATENT DOCUMENTS

| | | | | |
|---|---|---|---|---|
| 6,304,811 B1 * | 10/2001 | Prestl | ............................... | 701/96 |
| 2007/0067100 A1 * | 3/2007 | Matsumoto | .................... | 701/208 |
| 2009/0088925 A1 * | 4/2009 | Sugawara et al. | ................ | 701/41 |
| 2010/0228419 A1 * | 9/2010 | Lee et al. | ......................... | 701/25 |

FOREIGN PATENT DOCUMENTS

| | | | |
|---|---|---|---|
| JP | 2007-141053 | * | 6/2007 |
| JP | 2008-129839 | * | 6/2008 |
| JP | 2008-222153 A | | 9/2008 |
| JP | 2009-230377 | * | 10/2009 |

* cited by examiner

*Primary Examiner* — Michael J Zanelli
(74) *Attorney, Agent, or Firm* — McGinn IP Law Group, PLLC (57) ABSTRACT

In a driving support apparatus for a vehicle, when a driver indicates the intension to turn by turning a turn signal switch on, vehicles traveling on a lane to which the driver intends to turn is detected based on images captured by monitoring cameras, a space to cut into between the vehicles is calculated, an entry start time of a subject vehicle is obtained based on a speed difference between a speed of the subject vehicle and a moving speed of the space to cut into, and, when the entry start time is reached, voice guidance instructing to start turning is output from an instruction unit.

9 Claims, 8 Drawing Sheets

DRIVING SUPPORT APPARATUS FOR VEHICLE

CROSS-REFERENCE TO RELATED APPLICATIONS

The present application claims priority from Japanese Patent Application No. 2010-219650 filed on Sep. 29, 2010, the entire contents of which are hereby incorporated by reference.

BACKGROUND OF THE INVENTION

1. Field of the Invention

The present invention relates to a driving support apparatus for a vehicle configured, when a subject vehicle is to turn in road, to set a space for the subject vehicle to cut into in a lane to which the subject vehicle attempts to enter, obtain an entry start time for allowing the subject vehicle to enter the space to cut into, and, when the entry start time is reached, output an entry start instruction signal to an instruction display unit to notify the driver of the timing of starting steering for turning.

2. Description of Related Art

For turning while traveling on an expressway, such as entering a driving lane from a merge lane, changing from a driving lane to a passing lane, or changing back from a passing lane to a driving lane, the driver grasps road traveling conditions of the lane to which the vehicle is to change based on information that can be obtained through side mirrors (door mirrors and fender mirrors) and a rearview mirror while looking ahead carefully, and sets a vehicle speed and a timing (steering start timing) for starting turning to smoothly turn and cut into the lane. However, the driver has to be skilled to some extent so as to perform the series of operations while looking ahead carefully. This is difficult for beginner drivers and makes them avoid driving on an expressway.

Therefore, there have been proposed various driving support apparatuses allowing a beginner driver to easily turn on an expressway. For example, Japanese Patent Application Laid-Open (JP-A) No. 2008-222153 discloses a technique of, when a subject vehicle is to enter a driving lane from a merge lane, detecting conditions of other vehicles within an area corresponding to the driving lane, such as distance from the subject vehicle, vehicle length, vehicle speed, acceleration, by means of a rearview camera mounted on a door mirror to calculate an empty space, determining the empty space as a merge position if the empty space is determined to have a sufficient length for the subject vehicle to cut into and to be reachable without excessive acceleration, and displaying the merge position in the door mirror so as to allow the driver to correctly grasp the timing for the subject vehicle to cut thereinto.

In the technique disclosed in JP-A No. 2008-222153, however, a device for displaying an image showing the merge position in the door mirror is required, which requires the door mirror to have a special structure. The technique thus lacks versatility, and increases product cost.

In situations such as changing to a next lane, changing from a driving lane to a passing lane or changing back to a driving lane from a passing lane in addition to the situation of making the subject vehicle enter a driving lane from a merge lane while driving on an expressway, it is difficult for a beginner driver to determine the timing therefor. It would be often useful to offer a driving support in such situations in many cases.

In the technique disclosed in JP-A No. 2008-222153, however, a target area for merging support is determined by a car navigation system through map matching between position information from a GPS and map data, and conditions of a driving lane are detected automatically if an area is determined to be a target area for merging support. Therefore, the technique lacks convenience since it cannot be applied to a vehicle on which a GPS is not mounted, and cannot be used in situations other than making a subject vehicle enter a driving lane from a merge lane.

SUMMARY OF THE INVENTION

In view of the aforementioned circumstances, the present invention aims to provide a driving support apparatus for a vehicle that can be used with conventional products such as conventional side mirrors and a conventional rearview mirror, further that can automatically support a vehicle for a turning timing even if the vehicle has no car navigation system mounted thereon, thereby achieving high versatility.

In order to achieve the object, a driving support apparatus for a vehicle according to the present invention includes: a turn signal switch to be operated when making a turn; a traveling condition imaging unit configured to capture road traveling conditions around a subject vehicle; a vehicle speed detecting unit configured to detect a vehicle speed of the subject vehicle; and a calculating unit configured to set a timing to start turning and a specified vehicle speed for turning. The calculating unit includes: a driving lane condition detecting unit configured to check which of a right turn switch and a left turn switch of the turn signal switch is turned on when the turn signal switch is turned on, detect traveling conditions of a vehicle traveling on a lane on the turned-on-switch side based on road the traveling conditions captured by the traveling condition imaging unit and detect a space to cut into based on the detection result of the road traveling conditions; and a vehicle entry timing detecting unit configured to obtain an entry start time at which the subject vehicle is to enter the space to cut into, and output a entry start instruction signal to an instruction display when the entry start time is reached.

According to the present invention, when the turn signal switch is turned on, traveling conditions of a vehicle traveling on a lane on the turned-on-switch side based on the road traveling conditions captured by the traveling condition imaging unit, the space to cut into is detected based on the detection result of the road traveling conditions, and the entry start time at which the subject vehicle is to enter the space to cut into is set based on the speed difference between the subject vehicle speed and the moving speed of the space to cut into. Therefore, it is possible to use conventional products without any modification, and without the need to provide side mirrors and a rearview mirror with additional special device for displaying images. Moreover, it is possible to automatically support a vehicle in relation to a turning timing even if the vehicle has no car navigation system mounted thereon, thereby achieving a better user friendliness and higher versatility.

DETAILED DESCRIPTION OF THE PREFERRED EMBODIMENTS

An embodiment of the present invention will be described below with reference to the drawings. A driving support apparatus for a vehicle according to the present embodiment is mounted on a vehicle such as an automobile (not shown), and configured to detect that the driver intends to enter a driving lane from a merge lane on an expressway or that the driver intends to turn while driving on a main road and perform automatic driving support.

Figure 1:
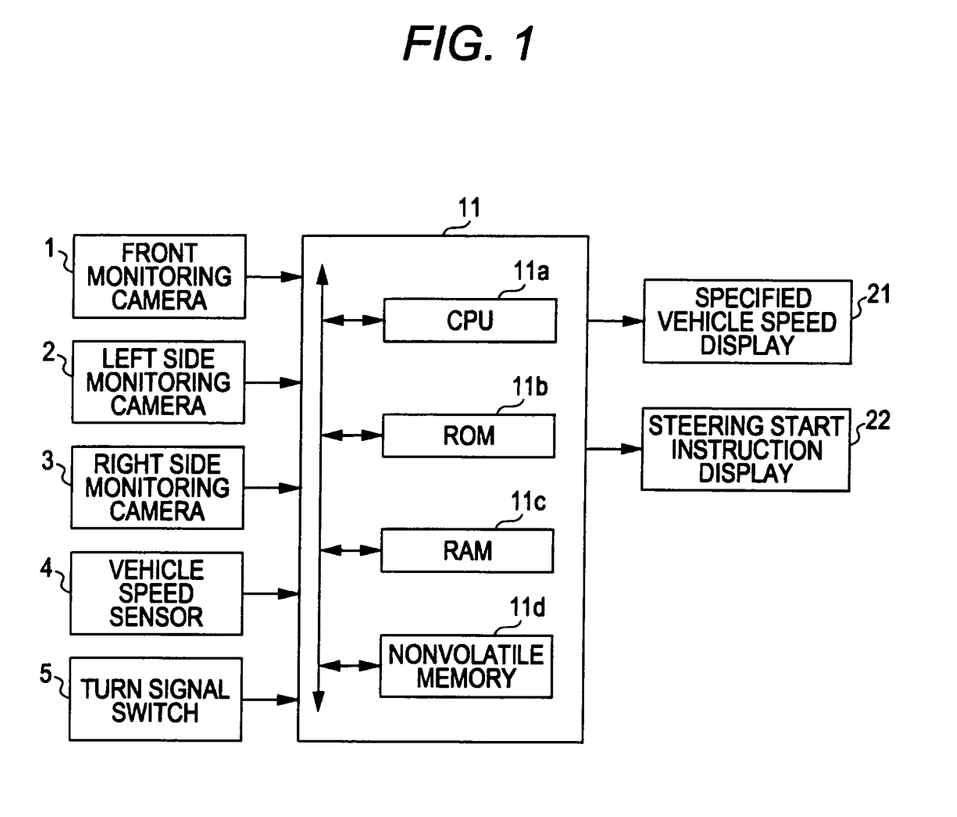
FIG. 1 is a schematic configuration diagram of a driving support apparatus for a vehicle.

As illustrated in FIG. 1, the driving support apparatus for a vehicle includes a front monitoring camera 1, a left side monitoring camera 2, a right side monitoring camera 3, a vehicle speed sensor 4 serving as a vehicle speed detecting unit, a turn signal switch 5, a driving support controlling unit (hereinafter referred to as a "driving support_ECU") 11 serving as a calculating unit, a specified vehicle speed display 21 serving as a specified vehicle speed display unit, and a steering start instruction unit 22. The monitoring cameras 1 to 3 correspond to a traveling condition imaging unit in the present invention.

The front monitoring camera 1 is a stereo camera unit having a pair of cameras (see FIGS. 6 to 8) attached above a rearview mirror arranged in a front portion of a passenger compartment, and includes solid state imaging devices such as CCDs and CMOSs. The solid state imaging devices image road traveling conditions (a white line, a preceding vehicle, a guardrail and the like) ahead of the subject vehicle. The front monitoring camera 1 may be a monocular camera.

The left side monitoring camera 2 is attached to a left door mirror of the subject vehicle and images the left rear of the subject vehicle. The right side monitoring camera 3 is attached to a right door mirror of the subject vehicle and images the right rear of the subject vehicle. Both the monitoring cameras 2 and 3 are a stereo camera unit or a monocular camera unit similar to the front monitoring camera 1 described above, and include solid state imaging devices such as CCDs and CMOSs. The solid state imaging devices image road traveling conditions left rearward and right rearward of the subject vehicle. Thus, the road traveling conditions around the subject vehicle are detected based on images captured by the monitoring cameras 1 to 3.

The vehicle speed sensor 4 is configured to detect a vehicle speed based on rotation speeds of a transmission output shaft and wheels. The turn signal switch 5 includes a left turn switch and a right turn switch, and is in an off state at a middle position. The left turn switch is turned on by turning a turn signal lever in a counterclockwise direction, and a turn signal lamp on the left side of the vehicle body starts to blink. On the other hand, the right turn switch is turned on by turning the turn signal lever in a clockwise direction, and a turn signal lamp on the right side of the vehicle body starts to blink. While traveling on an expressway, the intention that the subject vehicle is to turn is indicated to a following vehicle by turning on the turn signal switch 5 to blink either the left or the right turn signal lamp.

Signals that are detected by these sensors and switches are input to the driving support_ECU 11. The driving support_ECU 11 is mainly constituted by a known microcomputer including a CPU 11*a*, a ROM 11*b*, a RAM 11*c*, a nonvolatile memory lid and the like. The CPU 11*a* calculates a specified vehicle speed for entering a lane or changing lanes and a steering start timing based on the signals from various sensors and switches, and outputs operation signals to the specified vehicle speed display 21, the steering start instruction unit 22 and the like according to control programs stored in the ROM 11*b*. The ROM 11*b* has stored therein fixed data such as an expressway pattern, which will be described below, and the RAM 11*c* has temporarily stored therein various data calculated in the CPU 11*a*.

The specified vehicle speed display 21 includes a plurality of LEDs arranged for every 5 [km/h], for example, around an outer periphery of a speedometer (not shown), for example, and indicates to the driver a target speed for entering a driving lane from a merge lane or for changing driving lanes by lighting or blinking an LED at a position corresponding to the specified vehicle speed.

On the other hand, the steering start instruction unit 22 is configured, when entering a driving lane from a merge lane or when changing driving lanes, to indicate a steering start timing for the subject vehicle to cut into a space between vehicles traveling on the driving lane which the subject vehicle attempts to enter, and inform the timing by means of a voice or a screen display, for example.

Figure 2:
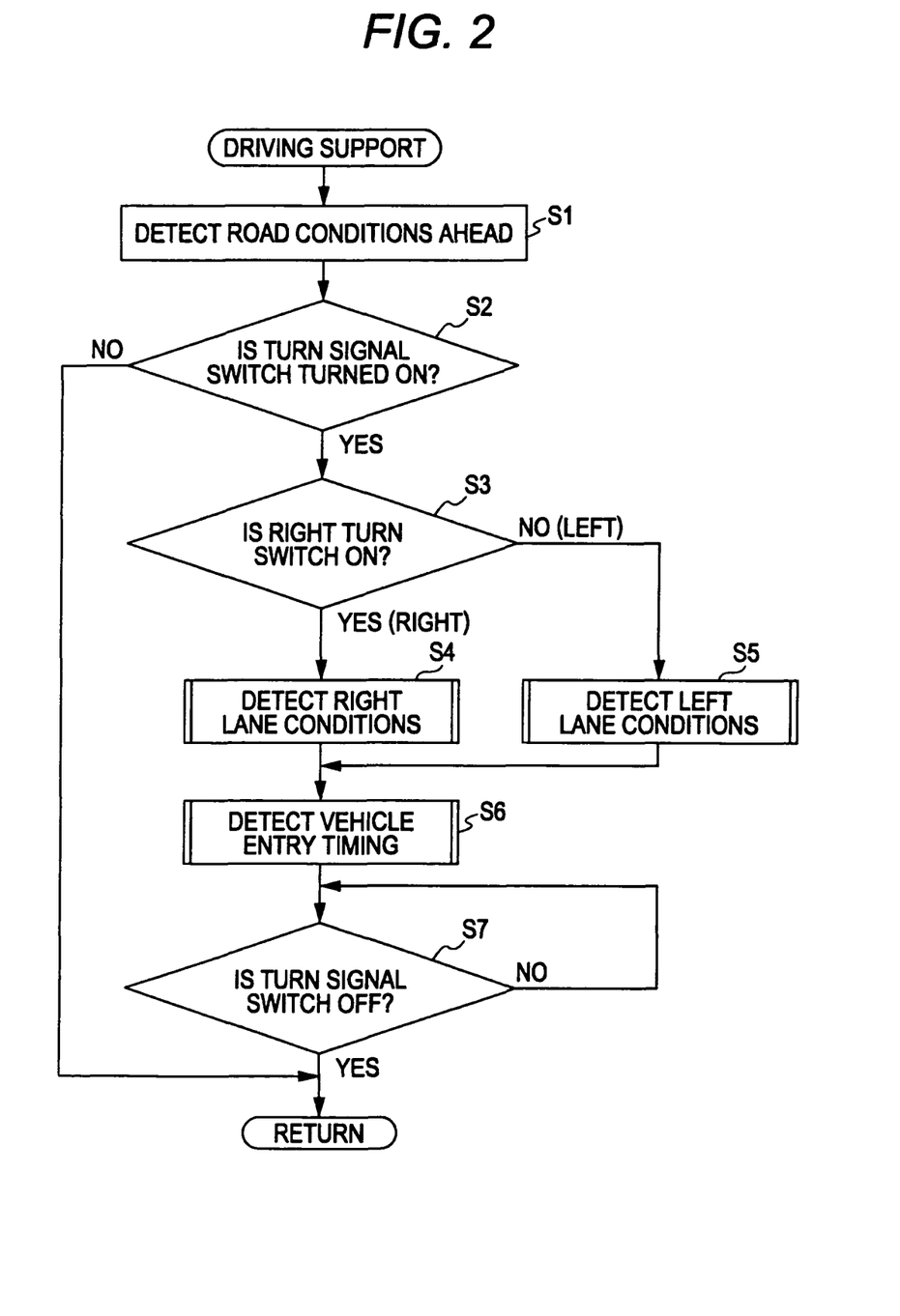
FIG. 2 is a flowchart showing a driving support process routine.

Specifically, the driving support process performed by the driving support_ECU 11 described above is performed according to a driving support process routine shown in FIG. 2.

Figure 6:
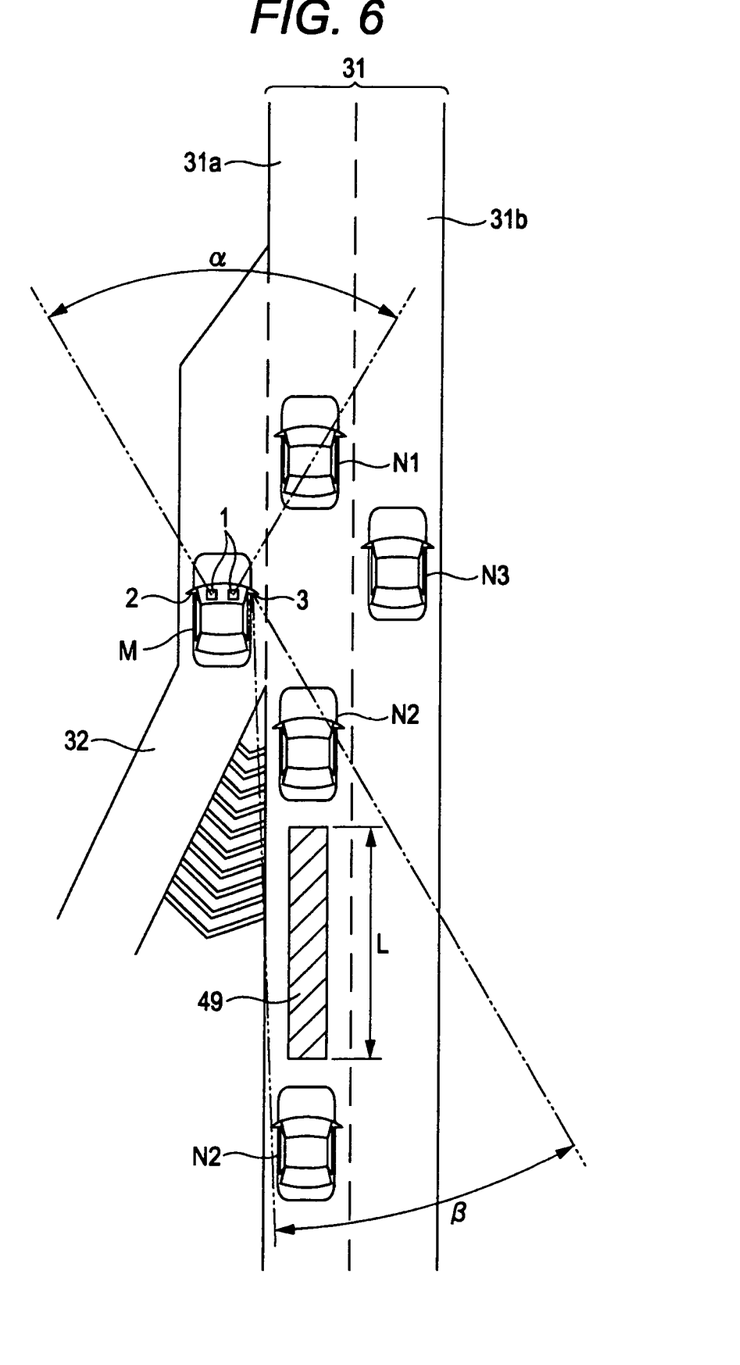
FIG. 6 is an explanatory view illustrating driving support for entering a driving lane from a merge lane.
Figure 7:
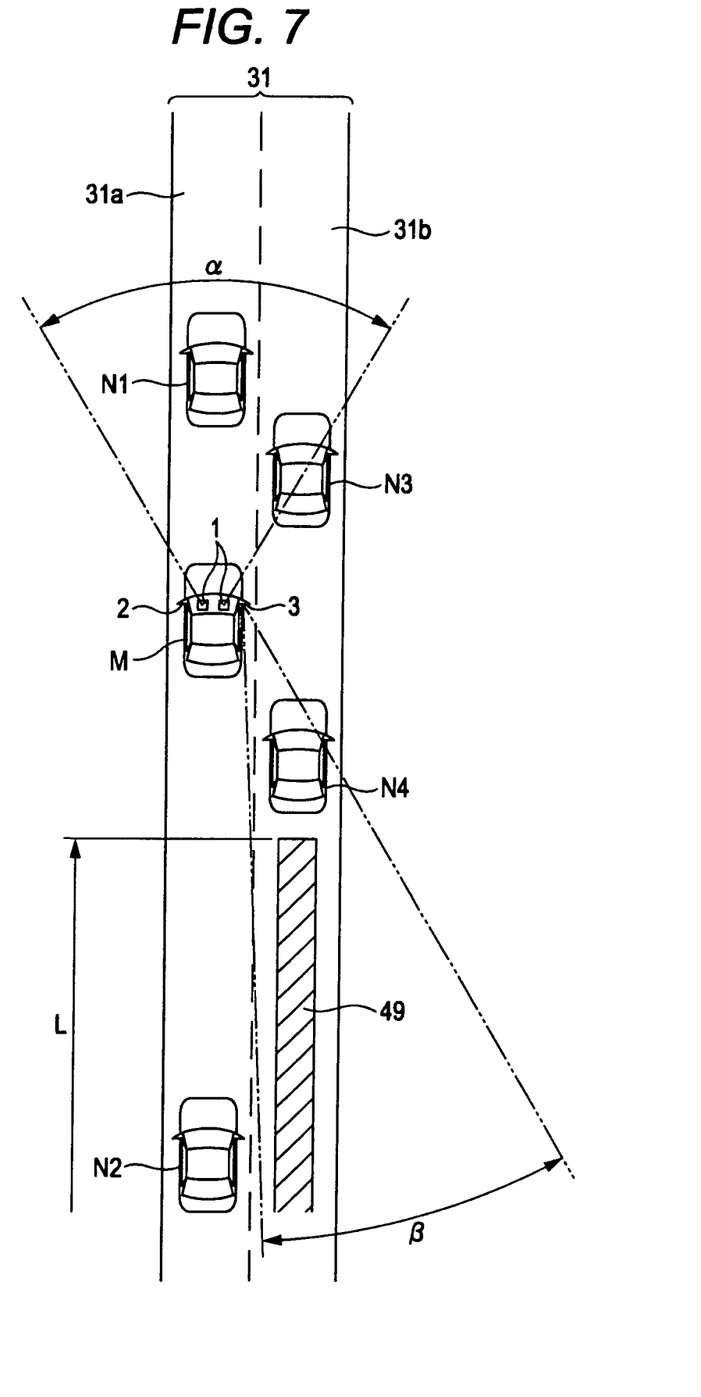
FIG. 7 is an explanatory view illustrating driving support for changing from a driving lane to a passing lane.
Figure 8:
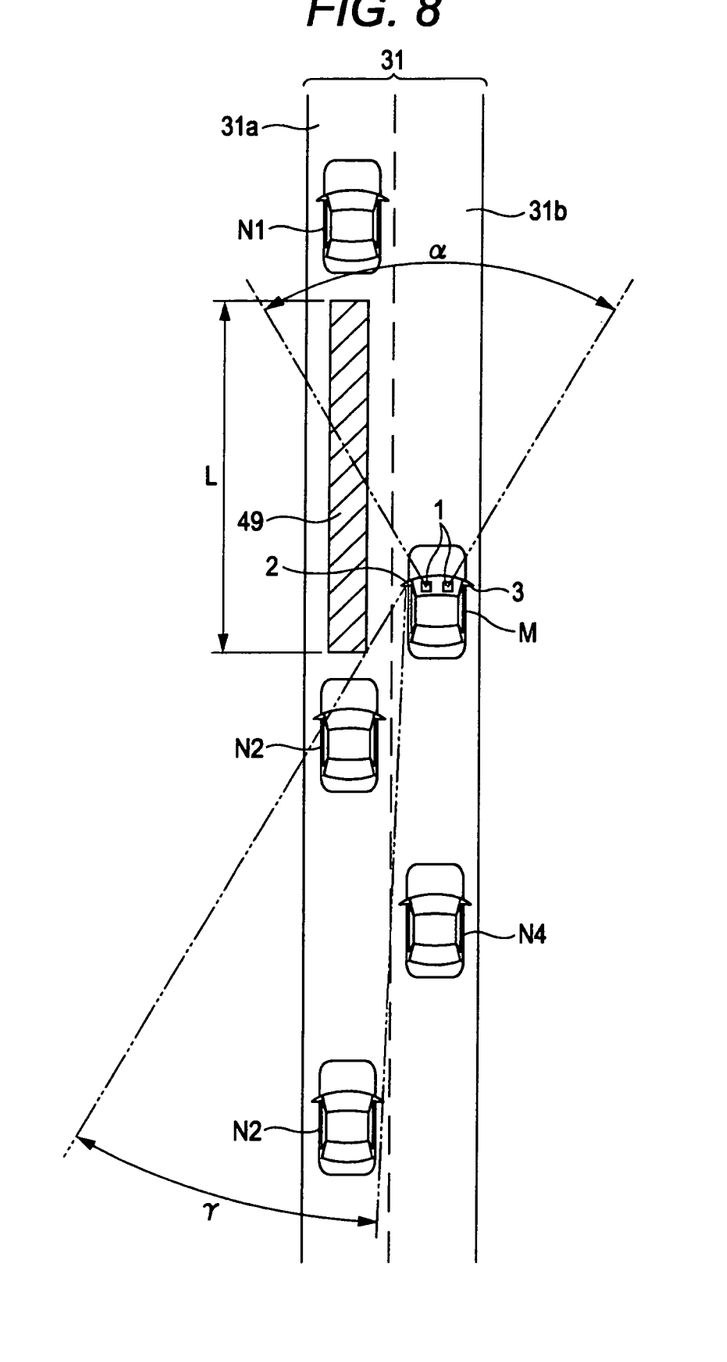
FIG. 8 is an explanatory view illustrating driving support for changing from a passing lane back to a driving lane.

In this routine, firstly in step S1, road traveling conditions ahead of a subject vehicle M (whether the subject vehicle M is driving on a main road of an expressway or a merge lane thereof, a preceding vehicle, vehicles traveling on the next lane, inter-vehicle distances between these vehicles and the subject vehicle M, and the like) are detected based on images captured by the front monitoring camera 1, as shown FIGS. 6 to 8. Whether the subject vehicle M is traveling on a main road of an expressway or a merge lane thereof is determined by pattern matching between expressway patterns stored in advance as fixed data and a front image captured by the front monitoring camera 1, for example. In this case, if it is determined that the subject vehicle M is traveling on a main road or that the subject vehicle M is not traveling on a merge lane, the routine may be exited. The following description will be made particularly on a case of traveling on an expressway.

Next in step S2, it is checked whether or not the turn signal switch 5 is turned on. If the turn signal switch 5 is off, the routine is exited without any change. If it is determined that the turn signal switch 5 is on, on the other hand, the process proceeds to step S3, where it is checked whether or not the right turn switch is on. Then, the process proceeds to step S4 if the right turn switch is on, or to step S5 if the left turn switch is on. In step S4, a right lane condition detecting process is performed, while, in step S5, a left lane condition detecting process is performed. The processes in steps S4 and S5 correspond to a driving lane condition detecting unit in the present invention.

Figure 3:
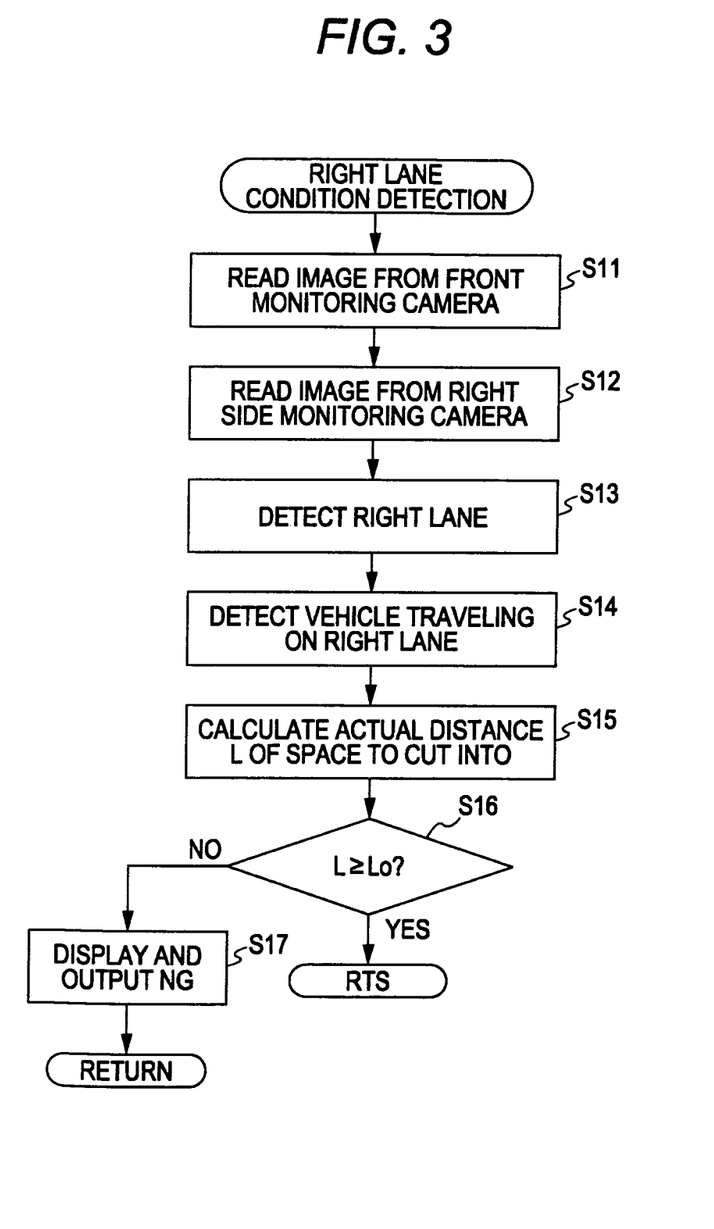
FIG. 3 is a flowchart showing a right lane condition detecting process sub-routine.
Figure 4:
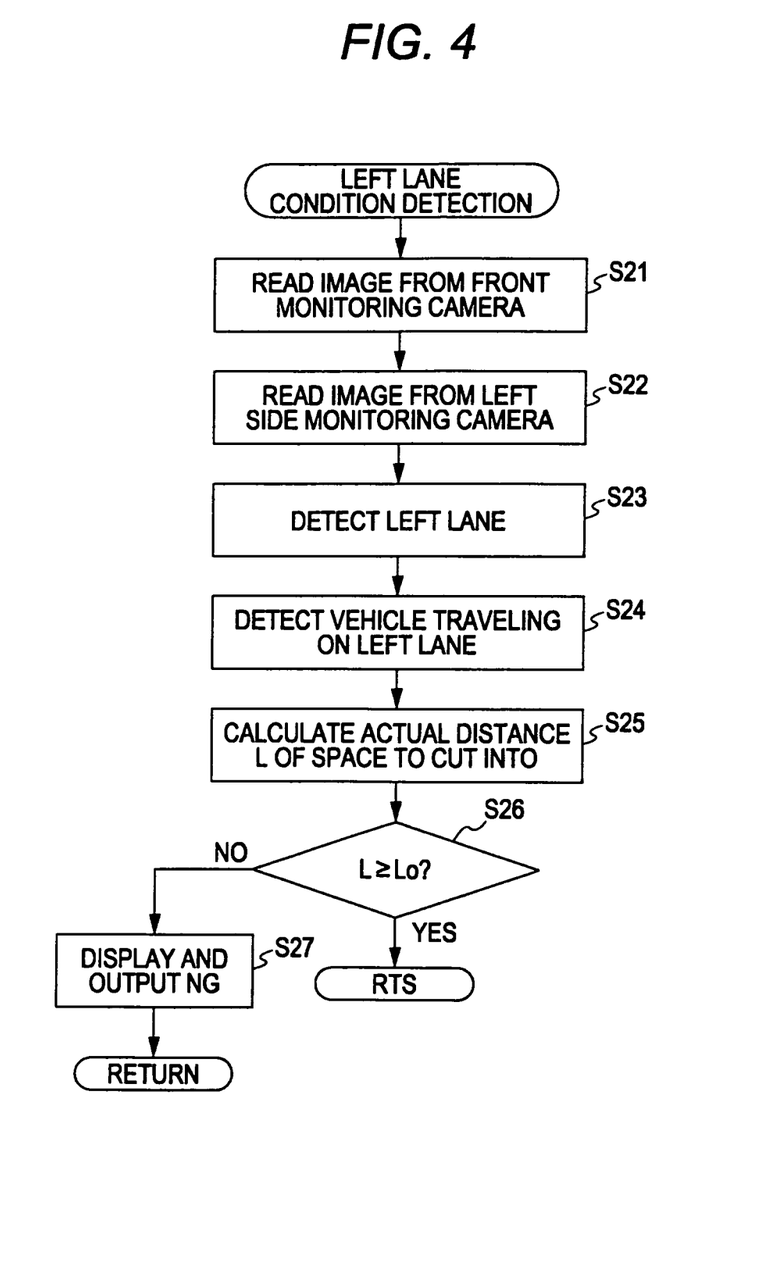
FIG. 4 is a flowchart showing a left lane condition detecting process sub-routine.

The right lane condition detecting process is performed according to the right lane condition detecting process sub-routine shown in FIG. 3, and the left lane condition detecting process is performed according to the left lane condition detecting process sub-routine shown in FIG. 4. In the following, the right lane condition detecting process sub-routine of FIG. 3 will be described first, and subsequently, the left lane condition detecting process sub-routine of FIG. 4 will be described.

First, in the sub-routine shown in FIG. 3, images captured by the front monitoring camera 1 are read in step S11, and images captured by the right side monitoring camera 3 are read in step S12.

Then, in step S13, an area corresponding to the right lane is detected based on the images captured by the cameras 1 and 3, and the process proceeds to step S14, where a vehicle traveling on the right lane is detected.

Specifically, as shown in FIG. 6, if the subject vehicle M attempts to enter a driving lane 31a of a main road of an expressway (hereinafter will be referred to simply as the "main road") 31 from a merge lane 32, a preceding vehicle N1 traveling on the driving lane 31a is detected based on images captured by the front monitoring camera 1, and a following vehicle N2 traveling on the driving lane 31a is detected based on images captured by the right side monitoring camera 3. In FIGS. 6 and 7, areas indicated by alternate long and two short dashes lines show view ranges α of the front monitoring camera 1 and view ranges 13 of the right side monitoring camera 3. In the present embodiment, for ease of description, a vehicle traveling on the driving lane 31a ahead of the subject vehicle M is referred to as the preceding vehicle N1, a vehicle traveling on the driving lane 31 behind the subject vehicle M is referred to as the following vehicle N2, a vehicle traveling on a passing lane 31b ahead of the subject vehicle M is referred to as a preceding vehicle N3, and a vehicle traveling on the passing lane 31b behind the subject vehicle M is referred to as a following vehicle N4.

as shown in FIG. 7, if the subject vehicle M is traveling on the driving lane 31a of the main road 31 and attempts to change to the passing lane 31b therefrom, this sub-routine is also started, the preceding vehicle N1 traveling on the driving lane 31a and the preceding vehicle N3 traveling on the passing lane 31b are detected based on images captured by the front monitoring camera 1, and the following vehicle N4 traveling on the passing lane 31b is detected based on images captured by the right side monitoring camera 3.

Then, in step S15, an actual distance L in the front-rear direction of a space 49 to cut into formed between the vehicles N1 and N2 (the vehicles N3 and N4 in FIG. 7) traveling on the right lane (the driving lane 31a in FIG. 6; the passing lane 31b in FIG. 7) is calculated. Although the space 49 to cut into is shown as a space between vehicles that can be cut into in FIGS. 6 and 7 for descriptive purposes, the space to cut into is calculated for all spaces between vehicles in practice.

If the subject vehicle M attempts to enter the driving lane 31a on the main road 31 from the merge lane 32 as shown in FIG. 6, the actual distance L of the space 49 to cut into is calculated based on the inter-vehicle distance between the vehicles N1 and N2 traveling on the driving lane 31a based on images captured by the front monitoring camera 1 and the right side monitoring camera 3. The actual distance L of the space 49 to cut into is set by multiplying the inter-vehicle distance between the vehicles traveling on the driving lane 31a by a coefficient (0.8, for example) representing margins of spaces in front and in the rear thereof. This sub-routine is also applied when changing from the driving lane 31a to the passing lane 31b. In this case, if no following vehicle is present on the passing lane 31b as shown in FIG. 7, the actual distance L is set to a predetermined fixed value.

Subsequently, in step S16, a predetermined required distance Lo for the subject vehicle M to cut into and the actual distance L calculated in step S15 are compared. If L≥Lo is satisfied, it is determined that it is possible to cut into, and the process proceeds to step S6 in FIG. 2. If L<Lo is satisfied, on the other hand, it is determined that it is difficult to cut into and the process branches off to step S17, where information indicating NG is displayed on a monitor or the like to alert the driver, and the routine is exited.

In the left lane condition detecting process sub-routine shown in FIG. 4, on the other hand, firstly the images captured by the front monitoring camera 1 are read in step S21, and the images captured by the left side monitoring camera 2 are read in step S22.

Then, in step S23, an area corresponding to the left lane is detected based on the images captured by the cameras 1 and 2, and the process proceeds to step S24 where a vehicle traveling on the left lane is detected.

Specifically, as shown in FIG. 8, if the subject vehicle M attempts to change back to the driving lane 31a from the passing lane 31b, the preceding vehicle N1 traveling on the driving lane 31a is detected based on the images captured by the front monitoring camera 1, and the following vehicle N2 traveling on the driving lane 31a is detected based on the images captured by the left side monitoring camera 2. An area indicated by an alternate long and two short dashes line in FIG. 8 shows a view range γ of the left side monitoring camera 2.

Then, in step S25, an actual distance L of a space 49 to cut into formed between the vehicles N1 and N2 traveling on the driving lane 31a is calculated. As shown in FIG. 8, if the subject vehicle M attempts to change back to the driving lane 31a from the passing lane 31b, the actual distance L of the space 49 to cut into is calculated based on the inter-vehicle distance between the vehicles N1 and N2 traveling on the driving lane 31a based on the images captured by the front monitoring camera 1 and the left side monitoring camera 2. The actual distance L of the space 49 to cut into is set by multiplying the inter-vehicle distance between the vehicles traveling on the driving lane 31a by a coefficient (0.6, for example) representing margins of spaces in front and in the rear thereof. In this case, if no preceding vehicle N1 shown in FIG. 8 is present on the driving lane 31a, the actual distance L is set to a predetermined fixed value.

Subsequently, in step S26, a predetermined required distance Lo for the subject vehicle M to cut into and the actual distance L calculated in step S25 are compared. If L≥Lo is satisfied, it is determined that it is possible to cut into, and the process proceeds to step S6 in FIG. 2. If L<Lo is satisfied, on the other hand, it is determined that it is difficult to cut into and the process branches off to step S27, where information indicating NG is displayed on a monitor or the like to alert the driver, and the routine is exited.

In step S6 of FIG. 2 after the sub-routine of FIG. 3 or FIG. 4, a vehicle entry timing detecting process is performed, and the process then proceeds to step S7. The vehicle entry timing detecting process is performed according to the vehicle entry timing detecting process sub-routine shown in FIG. 5. The process in this step corresponds to a vehicle entry timing detecting unit in the present invention.

Figure 5:
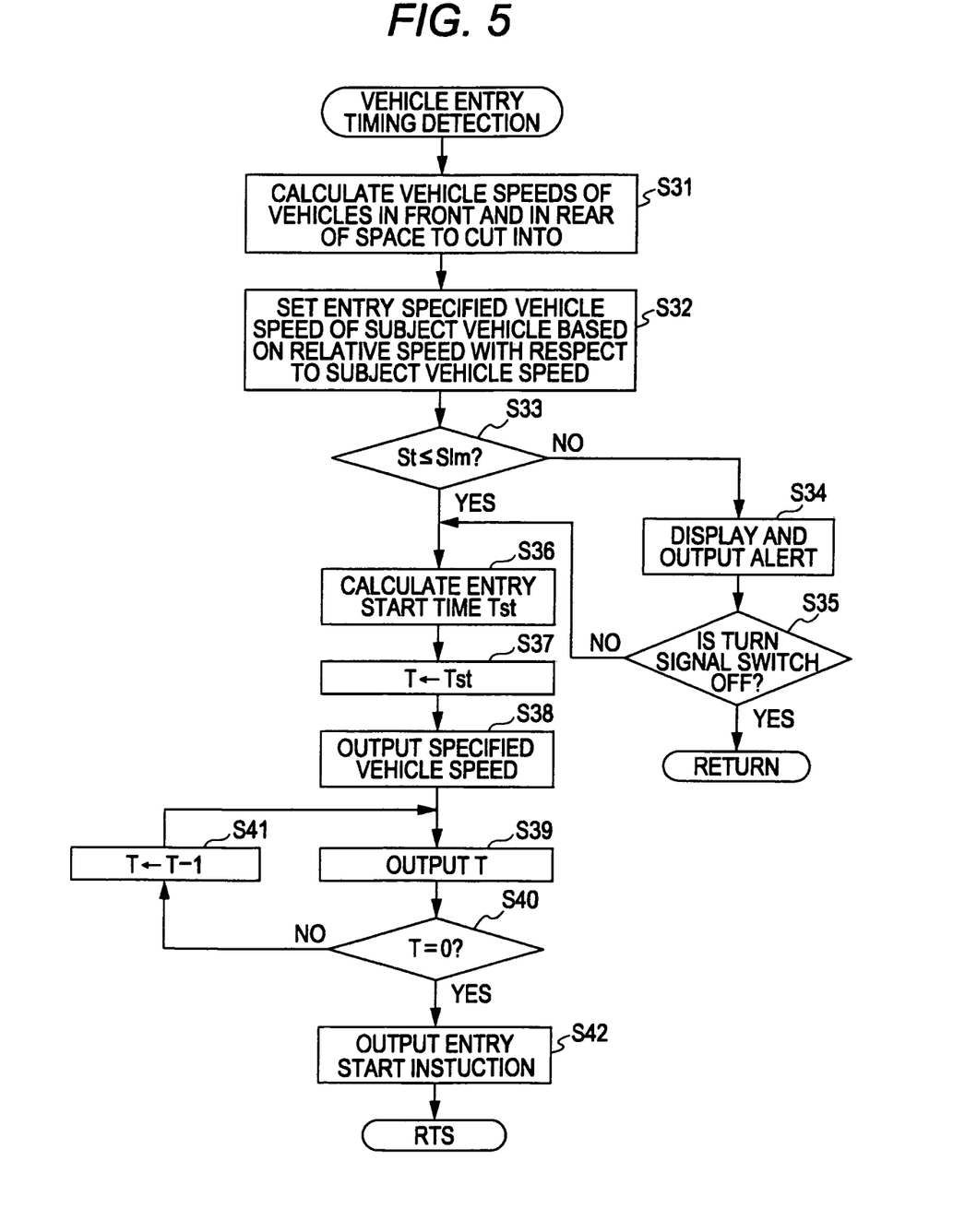
FIG. 5 is a flowchart showing a vehicle entry timing detecting process sub-routine.

In this sub-routine, firstly in step S31, the vehicle speeds of the vehicles traveling in front and in the rear of the space 49 to cut into that is determined to be a space into which the subject vehicle M can enter are calculated based on the images captured by the cameras 1 to 3 described above. Then in step S32, the moving speed of the space 49 to cut into is calculated from the vehicle speeds of the vehicles traveling in front and in the rear of the space 49 to cut into. Since the space 49 to cut into can be regarded as moving at a certain distance from the vehicle in front, an specified vehicle speed St for entering the space 49 to cut into that is a target speed for the subject vehicle M is set based on a difference in speed (relative speed) between the subject vehicle M and the space 49 to cut into.

The specified vehicle speed St is set to a vehicle speed that allows the subject vehicle M smoothly to enter the driving lane 31a of the main road 31 from the merge lane 32 or to enter the passing lane 31b from the driving lane 31a, and that is lower than the speed of the vehicle in front of the space 49 to cut into and equal to or slightly lower than the speed of the vehicle in the rear thereof. In other words, the specified vehicle speed is set to a vehicle speed that allows the driver of the vehicle in the rear of the space 49 who recognized entry of the subject vehicle M to decelerate in good time without needing to brake suddenly.

Next in step S33, the specified vehicle speed St and a vehicle speed limit Slm are compared. The vehicle speed limit Slm may be a fixed value of a legal speed for expressways (100 [km/h] for an automobile), or may be a regulatory speed (80 [km/h], for example) set for each road.

If St>Slm is satisfied, the specified vehicle speed St is an overspeed, and the process branches off to step S34, where an alert informing the overspeed is output to a monitor or the like for predetermined seconds (3 [sec], for example) to alert the driver, and proceeds to step S35 after a lapse of the predetermined seconds. In step S35, it is checked whether or not the turn signal switch 5 is turned off. If the turn signal switch 5 is turned off, it is determined that the driver has given up changing to the passing lane 31b, and the routine is exited. If the turn signal switch 5 is kept on, on the other hand, it is determined that the driver still has the intention to change lanes and the process proceeds to step S36. If it is determined that St≤Slm is satisfied in step S33, the process proceeds to step S36 without any change.

In step S36 after step S33 or S35, a time (entry start time) Tst until information instructing to start entering is informed to the driver is calculated. The entry start time Tst is calculated based on the difference in speed (relative speed) between the subject vehicle M and the space 49 to cut into. In other words, if the speed of the subject vehicle M is lower than the moving speed of the space 49 to cut into, a time until a leading end of the space 49 to cut into reaches a front end of the subject vehicle M is calculated as the entry start time Tst. On the other hand, if the speed of the subject vehicle M is higher than the moving speed of the space 49 to cut into, a time until a rear end of the subject vehicle M reaches a rear end of the space 49 to cut into is calculated as the entry start time Tst.

The case where the speed of the subject vehicle M is lower than the moving speed of the space 49 to cut into includes a situation in which the subject vehicle M is to enter from the merge lane 32 to the driving lane 31a (see FIG. 6), and a situation in which the subject vehicle M is to change from the driving lane 31a to the passing lane 31b (see FIG. 7). On the other hand, the case in which the speed of the subject vehicle M is higher than the moving speed of the space 49 to cut into includes a situation in which the subject vehicle M traveling on the passing lane 31b is to change back to the driving lane 31a (see FIG. 8).

The process then proceeds to step S37, where a count value T of a countdown timer is set to the specified entry start time Tst (T←Tst). Next in step S38, the specified vehicle speed St is output to and displayed on the specified vehicle speed display 21, and then in step S39, a countdown time corresponding to the count value T of the countdown timer is displayed on the monitor or notified by means of voice through a speaker. The driver adjusts a vehicle speed S to the specified vehicle speed St when the driver starts entering based on the specified vehicle speed St displayed on the specified vehicle speed display 21 and the countdown time output to a display unit such as a monitor and a speaker. In this process, if the specified vehicle speed St is higher than the vehicle speed S of the subject vehicle M, the driver depresses the accelerator pedal, and if the specified vehicle speed St is lower than the vehicle speed S of the subject vehicle M, the driver releases the accelerator pedal.

Then in step S40, it is checked whether or not the count value T of the countdown timer is 0. If T>0 is satisfied, the process proceeds to step S41 where the count value T of the countdown timer is decremented (T←T−1), and returns to step S39.

On the other hand, if it is determined that the counter value T of the countdown timer has reached 0 (T=0) in step S40, the process proceeds to step S42 where an entry start instruction signal is output to the steering start instruction unit 22. Then, the steering start instruction unit 22 provides voice guidance instructing to start steering for turning for predetermined seconds (3 [sec], for example). The driver starts steering for turning according to this voice guidance.

Then, in step S7 of FIG. 2, it is waited until the turn signal switch 5 is turned off. When the turn signal switch 5 is turned off, the routine is exited. The specified vehicle speed St is displayed on the specified vehicle speed display 21 until the turn signal switch 5 is turned off, and the representation of the specified vehicle speed St disappears when the turn signal switch 5 is turned off.

As described above, according to the present embodiment, the intentions of the driver to enter the driving lane 31a from the merge lane 32 of an expressway and to change from the driving lane 31a to the passing lane 31b or from the passing lane 31b to the driving lane 31a are detected through the on/off operations of the turn signal switch 5. Therefore, there is no need to separately provide a special device for displaying an image on a side mirror as in the conventional art, and conventional products such as conventional side mirrors and a conventional rearview mirror can be used without any modification, which is economical.

Since the road traveling conditions are detected based on images detected by the monitoring cameras 1 to 3 mounted on the vehicle, it is possible to automatically support a vehicle in relation to a turning timing even if it has no car navigation system mounted thereon, thereby achieving high versatility.

Furthermore, since the timing to start turning can be easily predicted based on the countdown time displayed on the monitor or the like, even a beginner driver can turn easily. At this time, the specified vehicle speed St for turning is simultaneously displayed. Therefore, the driver can easily have a sense of time to accelerate or decelerate to bring a current vehicle speed S to the specified vehicle speed St before starting turning, and even a beginner driver can easily make the subject vehicle M cut into the space 49 to cut into between vehicles.

The present invention is not limited to the above-described embodiment. For example, the information such as countdown time or the timing to start turning can be informed to the driver by either the display unit or the voice guidance unit or both of them. And a driving support apparatus for a vehicle according to the present invention can also be applied to an ordinary road. In this case, if the driving support apparatus is set to operate only while driving at a vehicle speed of 40 km/h or higher, for example, the apparatus will not be started even if the turn signal switch 5 is turned on when turning to the right or left on an ordinary road, which results in a better user friendliness.

What is claimed is:

1. A driving support apparatus for a vehicle, comprising:
a turn signal switch to be operated when making a turn;
a traveling condition imaging unit configured to capture road traveling conditions around a subject vehicle;
a vehicle speed detecting unit configured to detect a vehicle speed of the subject vehicle; and
a calculating unit configured to set a timing to start turning and a specified vehicle speed for turning, wherein
the calculating unit includes:
a driving lane condition detecting unit configured to check which one of a right turn switch and a left turn switch of the turn signal switch is turned on when the turn signal switch is turned on, detect traveling conditions of vehicles traveling on the turned-on switch side based on the road traveling conditions captured by the traveling condition imaging unit and detect a space to cut into based on the detection result of the road traveling conditions; and
a vehicle entry timing detecting unit configured to obtain an entry start time at which the subject vehicle is to enter the space to cut into, and output an entry start instruction signal to an instruction unit when the entry start time is reached.

2. The driving support apparatus for a vehicle according to claim 1, wherein the instruction unit is a display unit.

3. The driving support apparatus for a vehicle according to claim 1, wherein the instruction unit is a voice guidance unit.

4. The driving support apparatus for a vehicle according to claim 1, wherein the driving lane condition detecting unit determines whether or not the subject vehicle can cut into by comparing an actual distance in a front-back direction of the space to cut into with a predetermined required distance for the subject vehicle to cut into.

5. The driving support apparatus for a vehicle according to claim 1, wherein the vehicle entry timing detecting unit sets the entry start time based on a speed difference between the vehicle speed of the subject vehicle and a moving speed of the space to cut into.

6. The driving support apparatus for a vehicle according to claim 1, wherein the vehicle entry timing detecting unit outputs a countdown time to the entry start time to the instruction unit.

7. The driving support apparatus for a vehicle according to claim 6, wherein the instruction unit is the display unit.

8. The driving support apparatus for a vehicle according to claim 6, wherein the instruction unit is the voice guidance unit.

9. The driving support apparatus for a vehicle according to claim 6, wherein the vehicle entry timing detecting unit outputs the specified vehicle speed for turning to a specified vehicle speed display unit when the countdown time is output.

* * * * *